Aug. 2, 1966   SHIN-ICHI KAWADA   3,263,506
GYROSCOPIC APPARATUS

Filed March 5, 1962   3 Sheets-Sheet 1

Inventor
Shin-ichi Kawada,
By Pierce, Scheffler & Parker
his Attorneys

United States Patent Office 3,263,506
Patented August 2, 1966

3,263,506
GYROSCOPIC APPARATUS
Shin-ichi Kawada, Tokyo, Japan, assignor to Tokyo Keiki Seizosho Company, Ltd., Tokyo, Japan, a corporation of Japan
Filed Mar. 5, 1962, Ser. No. 177,502
Claims priority, application Japan, Mar. 11, 1961, 36/8,541
2 Claims. (Cl. 74—5)

The present invention relates to a system for supporting a gyro rotor case, in a gyroscopic apparatus.

In a type of previously known conventional gyro compasses, a gyro rotor case which contains a high speed rotating gyro rotor is first supported relative to a first supporting member rotatably about a horizontal axis perpendicular to the gyro spin axis; next, the first supporting member is supported relative to a second supporting member outside of it rotatably about a vertical axis by suspending the first member from the second member with a piano wire; and, further, the second supporting member is supported relative to a third supporting member outside of it rotatably about a vertical axis, the second supporting member, or, the follower ring being rotatingly driven relative to the third supporting member so that no torsion of the piano wire exists by using a no-contact type mutual displacement detector between the first and second supporting members.

Another type of previously known gyro compass is characterized in that the gyro rotor case is first supported, relative to a first supporting member, rotatably about a verical axis by suspending the case from the member with a piano wire; next, the first supporting member is rotatably supported, relative to a second supporting member outside of it, about a horizontal axis; and, further, the second supporting member is rotatably supported, relative to a third supporting member outside of it, about a vertical axis, the second supporting member, or, the follower ring being rotatingly driven relative to the third supporting member so that there will exist no torsion of the piano wire, by using a no-contact type mutual displacement detector between the gyro rotor case and the first supporting member.

In either of the arrangements above stated, however, in the event the third supporting member is secured directly to a ship structure, when the latter inclines—due to rolling and pitching—the piano wire will support the gyro rotor case in its inclined status. To avoid this, that is to say, in order to permit the piano wire to support the gyro rotor case always in its vertical status, regardless of the rolling and pitching of the ship, a gimbal ring customarily has been provided between the third supporting member and a binnacle ("binnacle" being a technical term designating the receptacle of a gyro compass), whereby the third supporting member is rotatably supported, relative to the gimbal ring, about a first horizontal axis and the gimbal ring is rotatably supported, relative to the binnacle, about a second horizontal axis perpendicular to said first horizontal axis.

In such known gyro compasses, however, notwithstanding the fact that the third supporting member is a sufficiently large body for containing sequentially the second supporting member, the first supporting member and the gyro rotor case, each one rotatably relative to each other, in order to support it relative to the binnacle with sufficient tolerance against pitching and rolling of the ship covering a substantially wide range of angles, the gimbal ring and the binnacle must have a substantially large size. Applicant has discovered that in previously known gyro compasses such as above described, although the gyro rotor case is supported—as an essential property of a gyro compass—so as to have freedom of rotation about two axes perpendicular to the gyro spin axis and perpendicular to each other, it is not supported so as to have freedom of rotation about the gyro spin axis and, therefore, in order to support the third supporting member—and, hence, the gyro rotor case—so as not to be influenced by rolling and pitching, a gimbal ring must be provided between the third supporting member and the binnacle to give the third supporting member freedom of rotation about two horizontal axes.

Accordingly, the present invention provides for supporting the gyro rotor case, within the third supporting member above stated, so as to have freedom of rotation about the gyro spin axis, thereby eliminating the necessity of providing floating support means between the third supporting member and the binnacle, and as a result, making it possible to omit the gimbal ring, whereby the third supporting member may be mounted in a fixed relation to the binnacle, or the third supporting member may be made the binnacle itself. According to the novel supporting system of the present invention, the size of the binnacle as a whole—and, hence, that of the gyroscopic apparatus itself—can be substantially reduced, since relatively small space is necessary for ensuring freedom of mutual rotation over a sufficiently wide range of angles among relatively small members within the third supporting member.

The invention will now be described in further detail, and with reference to the accompanying drawing, in which.

Figure 1:
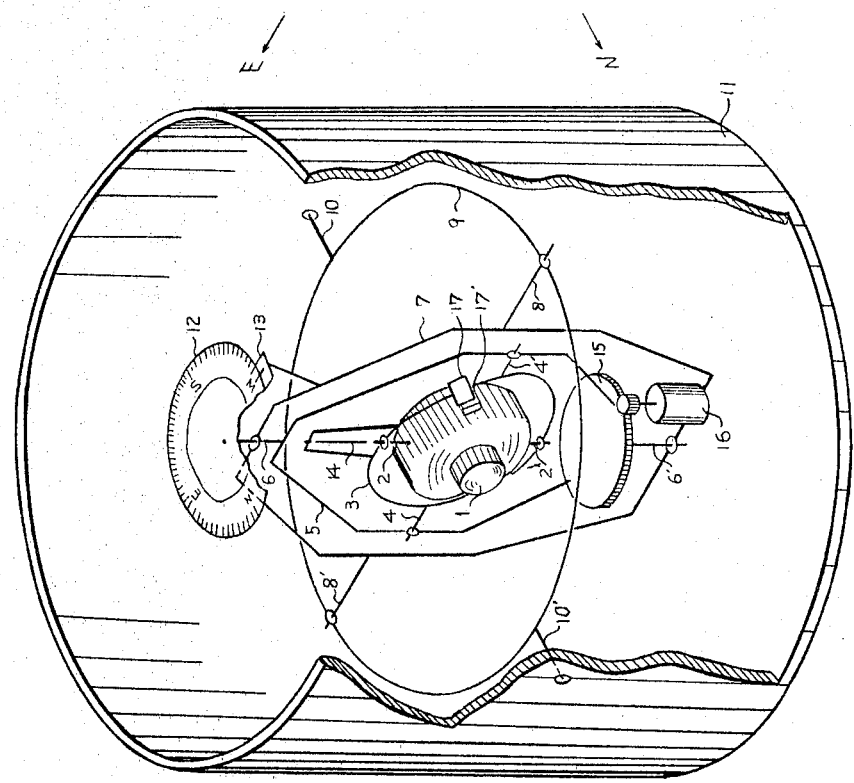
FIG. 1 shows the latter type of the referred to two previously known gyro compasses.

As noted above, FIG. 1 shows a type of previously known gyro compass. In FIG. 1 numeral 1 designates a gyro rotor case in which is contained a gyro rotor rotating at high speed. To the upper and lower parts of the case 1 there are secured vertical shafts 2 and 2', respectively, which shafts pass through upper and lower bearings, respectively, of a first supporting member in the form of a vertical ring 3. Vertical ring 3 has an upper extended portion to the top of which a piano wire 14 is attached. The upper end of upper vertical shaft 2 is connected to the lower end of wire 14. Consequently, the whole weight of gyro rotor case 1 is supported by the piano wire, and supports within the bearings around shafts 2 and 2' serve only to prevent transverse swings; therefore very little friction develops between these parts. The vertical ring 3 is supported by means of horizontal shafts 4 and 4' secured thereto relative to a second supporting member in the form of a vertical ring 5, rotatably about the axis of shafts 4, 4'. Vertical ring 5 is supported by means of vertical shafts 6 and 6', secured thereto at its upper and lower ends, relative to a third supporting member in the form of an outer vertical ring 7 rotatably about the axis of vertical shafts 6, 6'.

To vertical ring 3 and gyro rotor case 1 there are secured mutual displacement detector elements 17 and 17', respectively, which are opposed to each other.

To the lower end of vertical ring 5 there is secured a gear disc 15, while on a disc secured to the lower end of vertical ring 7 there is fixedly mounted a servo motor 16 whose pinion engages the gear disc 15. The servo motor 16 is operated responsive to the output of detector 17 and 17', thereby to rotate vertical ring 5 relative to vertical ring 7 so that mutual displacement between gyro rotor case 1 and vertical ring 3 will always be zero, and so that torsion of piano wire 14 will always be eliminated. In this arrangement, vertical ring 5 is called a follower ring.

Outer vertical ring 7 is supported by means of horizontal shafts 8 and 8', secured thereto, relative to gimbal ring 9 rotatably about the axis of those shafts, and gimbal ring 9 is supported by means of horizontal shafts 10 and 10' secured thereto and perpendicular to shafts 8 and 8' relative to binnacle 11 rotatably about the axis of those shafts. Because of supports by means of two pairs of perpendicular shafts 10, 10' and 8, 8' and gimbal ring 9, the outer vertical ring 7 is at all times held vertical irrespective of any shaking (rolling and pitching) in any direction of the ship, and hence of the binnacle 11. A compass card 12 is secured to follower ring 5, while a pointer 13 is secured to outer vertical ring 7 and their relative rotation angle provides readings of the ship's heading. According to such a system of support, outer vertical ring 7 being a substantially large body in order to give such body sufficient tolerance for rotation relative to gimbal ring 9 and binnacle 11 over a substantially wide range of angles along with motions of the ship, the gimbal ring and the binnacle must be constructed substantially large.

Figure 2:
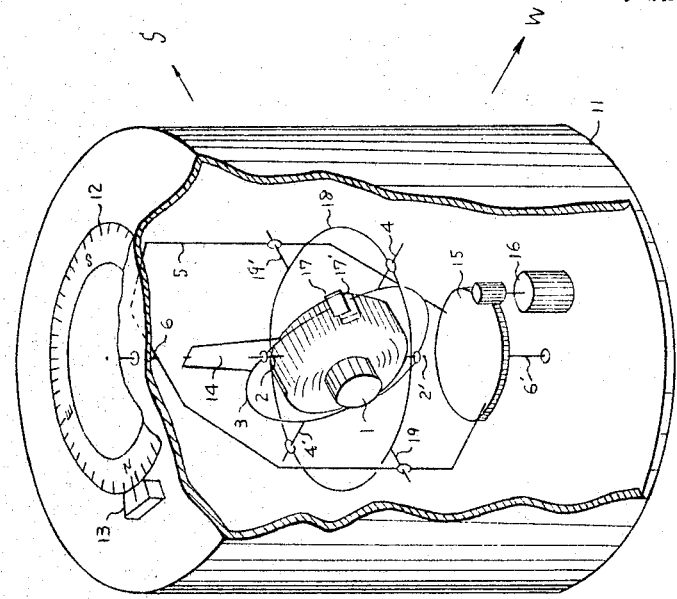
FIG. 2 is a diagrammatic representation, in perspective view and with certain parts broken away, of a gyro compass arrangement embodying principles of the present invention.

In FIG. 2, which illustrates one form of the present invention, a gyro rotor case 1 has its upper and lower vertical shafts 2 and 2', respectively, passed through bearings of a vertical ring 3 and suspended from the top of an upper extended portion of vertical ring 3 by means of a piano wire 14. The vertical ring 3 is supported by means of horizontal shafts 4 and 4' secured thereto relative to a horizontal ring 18 rotatably about said horizontal shafts 4, 4'. This horizontal ring 18 is supported by means of horizontal shafts 19 and 19' perpendicular to the above stated horizontal shafts 4 and 4' relative to a vertical ring 5 rotatably about those horizontal shafts 19 and 19'. This vertical ring 5 is supported by means of vertical shafts secured thereto at their upper and lower portions directly relative to a binnacle 11 rotatably about those vertical shafts. Similarly as in FIG. 1, mutual displacement detector elements 17 and 17' are secured to vertical ring 3 and gyro rotor case 1, respectively, while a gear disc 15 is secured to vertical ring 5, and a servo motor 16 is secured to binnacle 11. Servo motor 16 is operated responsive to the output of detector 17 and 17', thereby to rotate vertical ring 5 relative to binnacle 11 so that mutual displacement between detector elements 17 and 17' will always become zero and, hence, so that torsion of piano wire 14 will be eliminated under all conditions. Therefore, the vertical ring 5 rotates relative to binnacle 11, always following gyro rotor case 1, regardless of rotational displacement of binnacle 11. In this connection, vertical ring 5 is called a follower ring. A compass card 12 is secured to follower ring 5, while a pointer 13 is secured to binnacle 11, and their relative rotational angle provides readings of the ship's heading.

When comparing the apparatus shown in FIG. 2 with that shown in FIG. 1, only one horizontal ring 18 is interposed between follower ring 5 and its internal vertical ring 3, while outside of follower ring 5 such members as outer vertical ring 7, gimbal ring 9 and horizontal shafts 8 and 8' and 10, 10'—for rotatably supporting those rings as seen in FIG. 1—are all eliminated. Thus in FIG. 2, since no so large space is necessary for ensuring sufficient tolerance for free rotation over a substantially wide range of angles of horizontal ring 18 containing gyro rotor case 1 and vertical ring 3, the size of the binnacle can be considerably reduced compared with that in FIG. 1. In practice, the binnacle shown in FIG. 2 could be reduced to about one-third its volume compared with that of FIG. 1.

Furthermore, when the ship is inclined due to rolling and pitching, card 12 and pointer 13, in the arrangement illustrated in FIG. 1 are inclined relative to binnacle 11, resulting in difficulty of reading and in that a sufficiently large card cannot be attached, while card 12 and pointer 13, in FIG. 2—regardless of any inclination of the ship—are not inclined relative to binacle 11, resulting in the advantage that a card as large as desired can be attached without any trouble and that reading is made remarkably easy. Furthermore, according to the apparatus shown in FIG. 2, when the ship is inclined due to rolling and pitching, only vertical ring 5 and horizontal ring 18 are inclined therewith, while vertical ring 3 and gyro rotor case 1 are maintained in their vertical state, and, therefore, there exists substantially no friction by gravity between vertical shafts 2 and 2' and ball bearings which support them, resulting in the advantage that desirably high accuracy can be assured.

Figure 3:
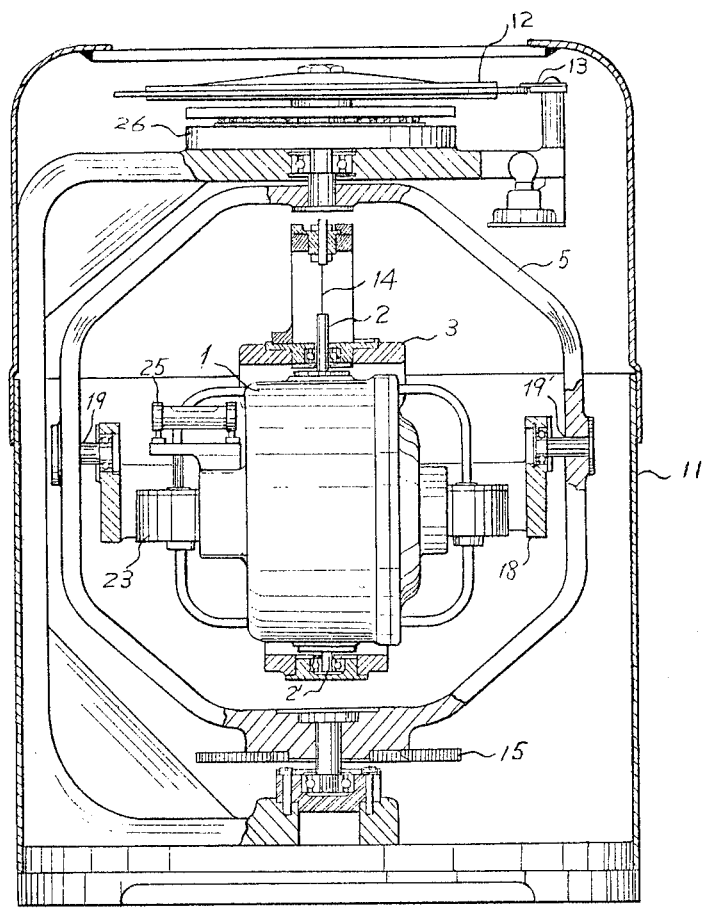
FIG. 3 is a sectional view of a practical construction of the gyro compass diagrammatically illustrated in FIG. 2, in which view the gyro spin axis of the gyro rotor, which rotates at high speed in the gyro rotor case, is shown in the left-and-right position.
Figure 4:
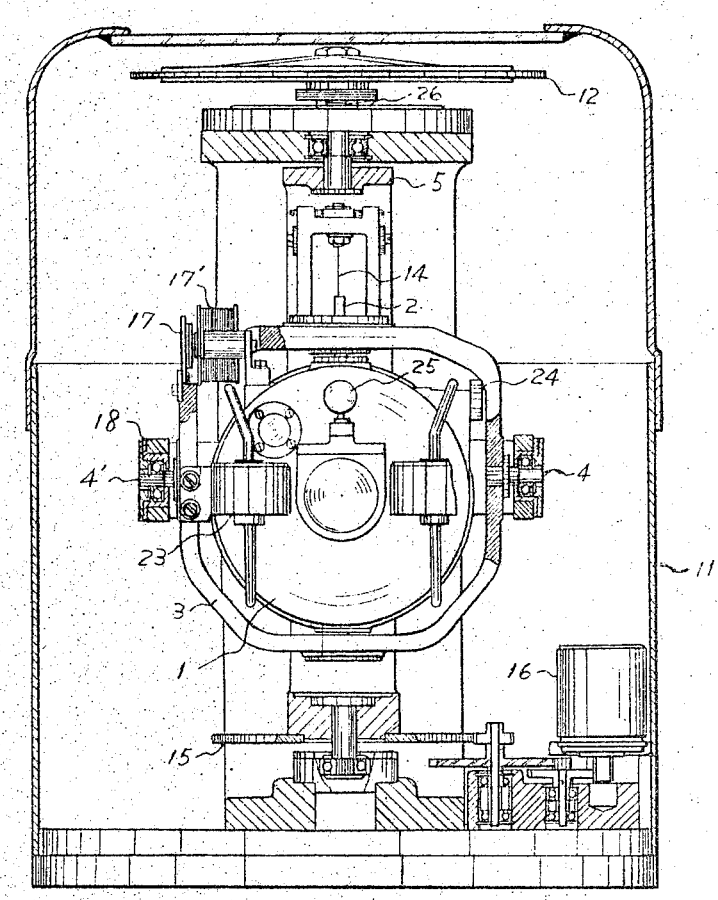
FIG. 4 is a section in a plane perpendicular to the drawing plane of FIG. 3.

In FIGS. 3 and 4, which illustrate a practical construction of the gyro compass diagrammatically shown in FIG. 2, the gyro spin axis (i.e., the rotor axis) of a gyro rotor which rotates at a high speed in gyro rotor case 1 is in the left-and-right direction in FIG. 3, and in the direction perpendicular to the drawing plane in FIG. 4. The construction for supporting vertical ring 3 rotatably relative to horizontal ring 18 by means of horizontal shafts 4 and 4' is shown clearly in FIG. 4, while the construction for supporting horizontal ring 18 rotatably relative to vertical follower ring 5 by means of horizontal shafts 19 and 19' is shown clearly in FIG. 3. In the latter construction, though bearings are mounted on the side of horizontal ring 18, they may alternatively be mounted on the side of vertical ring 5. These bearings, and all other bearings used at various parts, may be ball bearings, thereby to reduce friction to a minimum. Mutual displacement detector elements 17 and 17' are shown in FIG. 4. Thus, a coil 17' is secured to gyro rotor case 1, while an iron piece 17 is secured to vertical ring 3, and they are so constructed that a signal is generated in coil 17' responsive to their mutual positional relation. Furthermore, through the matter has no direct relation to the essentials of the present invention, a liquid ballistic 23 is secured to vertical ring 3 to serve as a north seeking device, and an attenuation device 24 for stopping the gyro rotor axis at true north position and a level 25 are mounted on gyro roto case 1. In FIG. 3, numeral 26 designates slip rings for conducting electricity into the present apparatus.

In the above described embodiment of the invention gyro rotor case 1 is suspended from vertical ring 3 by means of a piano wire 14, thereby to reduce torque due to friction between them almost to zero, but alternatively such means may be employed for supporting the weight that it is floated on oil, leaving only the engagement by vertical shafts 2 and 2'. Other various modifications may be devised without departing from the spirit of the present invention.

According to the present invention, without use of a gimbal ring of large size—which heretofore has been deemed inevitably necessary—the gyro rotor case and also the vertical ring controlled to follow it in non-contact state can be maintained always in vertical state irrespective of rolling and pitching of the ship, and therefore all space which would be necessary for a gimbal ring can be dispend with, thereby to reduce the size of the gyroscopic apparatus to a minimum; also a gyroscopic apparatus having only a very small error can be provided.

I claim:
1. A gyroscopic apparatus comprising
   a gyro case containing a high speed gyro rotor rotatable about an axis, said gyro case having secured at its upper and lower ends, upper and lower vertical shafts;

a first supporting member for supporting the gyro case provided with upper and lower guide bearings for receiving the upper and lower shafts, respectively, of the gyro case and a wire attached to the upper shaft for suspending the gyro case;

a second supporting member for supporting the first supporting member freely rotatably about a horizontal axis so that substantially no force is exerted between said first and second supporting members;

a third supporting member for supporting the second supporting member freely rotatably about another horizontal axis perpendicular to the first horizontal axis so that substantially no force is exerted between said second and third supporting members;

means for supporting the third supporting member to a binnacle rotatably about its vertical axis;

a mutual non-contact follower device including means detecting the rotary deflection between the gyro case and the first supporting member; and means responsive to the detecting means for driving the third supporting member.

2. A gyroscopic apparatus according to claim 1, including also a liquid ballistic means mounted on the first supporting member for north seeking and an attenuation means mounted on the gyro case for stopping the gyro rotor axis at true north as soon as possible.

References Cited by the Examiner
UNITED STATES PATENTS

| 2,677,194 | 5/1954 | Bishop | 74—5.9 X |
| 2,713,270 | 7/1955 | Jewell | 74—5.4 |
| 2,968,956 | 1/1961 | Agins | 74—5.9 |

FOREIGN PATENTS 630,657  10/1949  Great Britain.

FRED C. MATTERN, JR., *Primary Examiner.*

BROUGHTON G. DURHAM, *Examiner.*

T. W. SHEAR, P. W. SULLIVAN, *Assistant Examiners.*